(12) United States Patent
Esenwein et al.

(10) Patent No.: US 8,905,644 B2
(45) Date of Patent: Dec. 9, 2014

(54) SHAFT BEARING DEVICE FOR A HAND-HELD POWER TOOL

(75) Inventors: Florian Esenwein, Uhingen-Holzhausen (DE); Thomas Schomisch, Filderstadt (DE)

(73) Assignee: Robert Bosch GmbH, Stuttgart (DE)

( * ) Notice: Subject to any disclaimer, the term of this patent is extended or adjusted under 35 U.S.C. 154(b) by 11 days.

(21) Appl. No.: 13/814,220

(22) PCT Filed: Jun. 6, 2011

(86) PCT No.: PCT/EP2011/059238
§ 371 (c)(1),
(2), (4) Date: Apr. 15, 2013

(87) PCT Pub. No.: WO2012/016730
PCT Pub. Date: Feb. 9, 2012

(65) Prior Publication Data
US 2013/0205604 A1 Aug. 15, 2013

(30) Foreign Application Priority Data
Aug. 6, 2010 (DE) .......... 10 2010 038 990

(51) Int. Cl.
| | |
|---|---|
| F16C 43/04 | (2006.01) |
| F16C 19/16 | (2006.01) |
| B24B 41/04 | (2006.01) |
| F16C 35/04 | (2006.01) |
| F16C 19/06 | (2006.01) |
| F16C 19/10 | (2006.01) |
| F16C 33/76 | (2006.01) |
| B24B 23/02 | (2006.01) |
| F16C 35/077 | (2006.01) |
| B25F 5/00 | (2006.01) |

(52) U.S. Cl.
CPC ............... *F16C 19/06* (2013.01); *F16C 19/16* (2013.01); *B24B 41/04* (2013.01); *F16C 35/042* (2013.01); *F16C 19/10* (2013.01); *F16C 33/76* (2013.01); *B24B 23/028* (2013.01); *F16C 35/077* (2013.01); *B25F 5/00* (2013.01)
USPC .......................................... 384/537; 384/584

(58) Field of Classification Search
CPC ...... F16C 35/06; F16C 35/063; F16C 35/067; F16C 35/07; F16C 35/077; B24B 23/02; B24B 23/024; B24B 23/028; B25B 17/00; B25B 21/00
USPC .......... 384/537, 542, 584, 585; 451/358, 359, 451/360
See application file for complete search history.

(56) References Cited

U.S. PATENT DOCUMENTS 3,469,897 A * 9/1969 Rike .............................. 384/542
4,232,414 A * 11/1980 Curtiss .......................... 451/295

(Continued)

FOREIGN PATENT DOCUMENTS

| DE | 28 16 398 A1 | 10/1979 |
| DE | 100 65 658 A1 | 7/2002 |

(Continued)

OTHER PUBLICATIONS

International Search Report corresponding to PCT Application No. PCT/EP2011/059238, mailed Mar. 12, 2012 (German and English language document) (7 pages).

*Primary Examiner* — Phillip A Johnson
(74) *Attorney, Agent, or Firm* — Maginot, Moore & Beck LLP

(57) ABSTRACT

A shaft bearing device for a hand-held power tool, in particular for an angle grinder and/or a circular saw, includes at least one first support unit and at least one second support unit which are intended to axially and/or radially support a bearing element of a shaft. At least one of the at least two support units is formed at least partially by a plate element that has at least one axial and/or radial bend.

20 Claims, 9 Drawing Sheets

(56) References Cited

U.S. PATENT DOCUMENTS

2005/0037701 A1* 2/2005 Steimel et al. ............... 451/359
2008/0153683 A1* 6/2008 Kirkpatrick et al. ........... 492/16

FOREIGN PATENT DOCUMENTS

| DE | 103 55 363 A1 | 6/2005 |
| DE | 10 2008 040 673 A1 | 1/2010 |

* cited by examiner

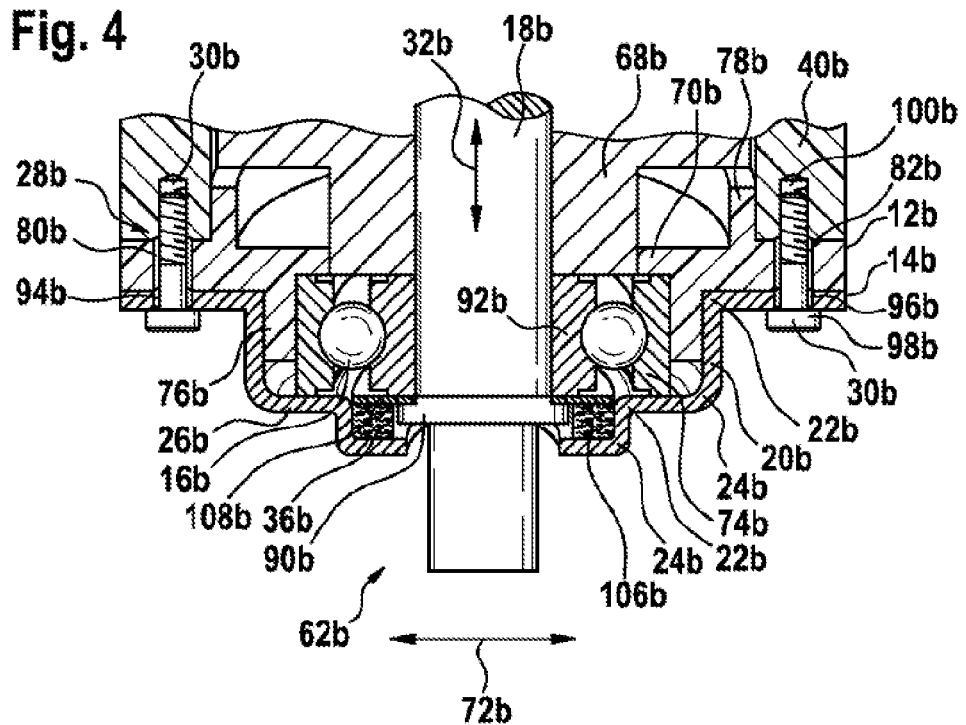
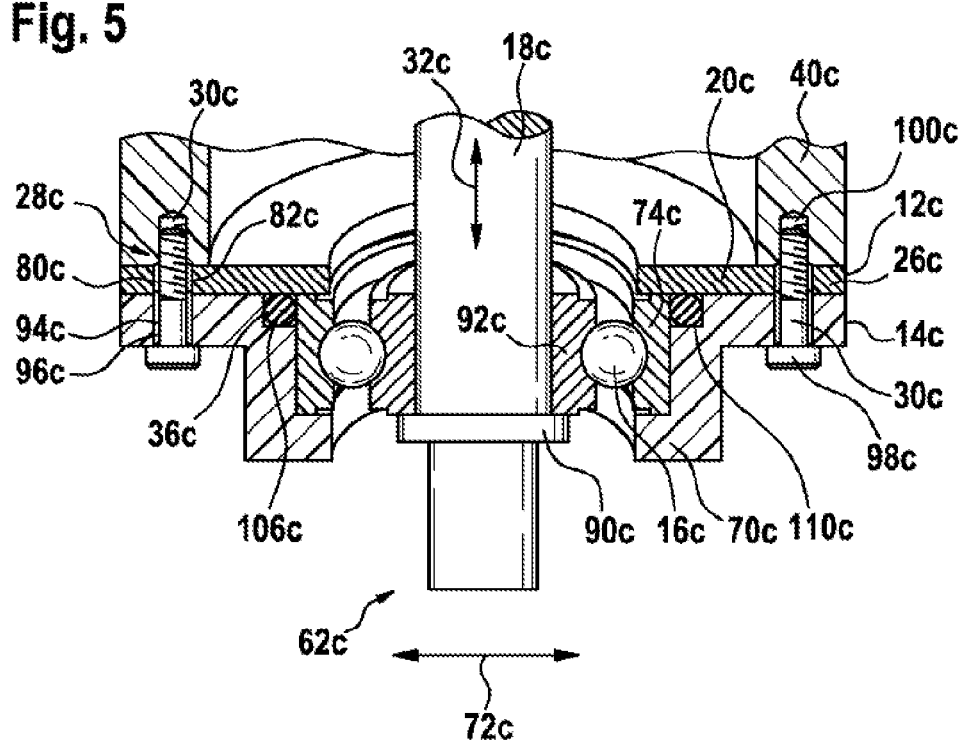

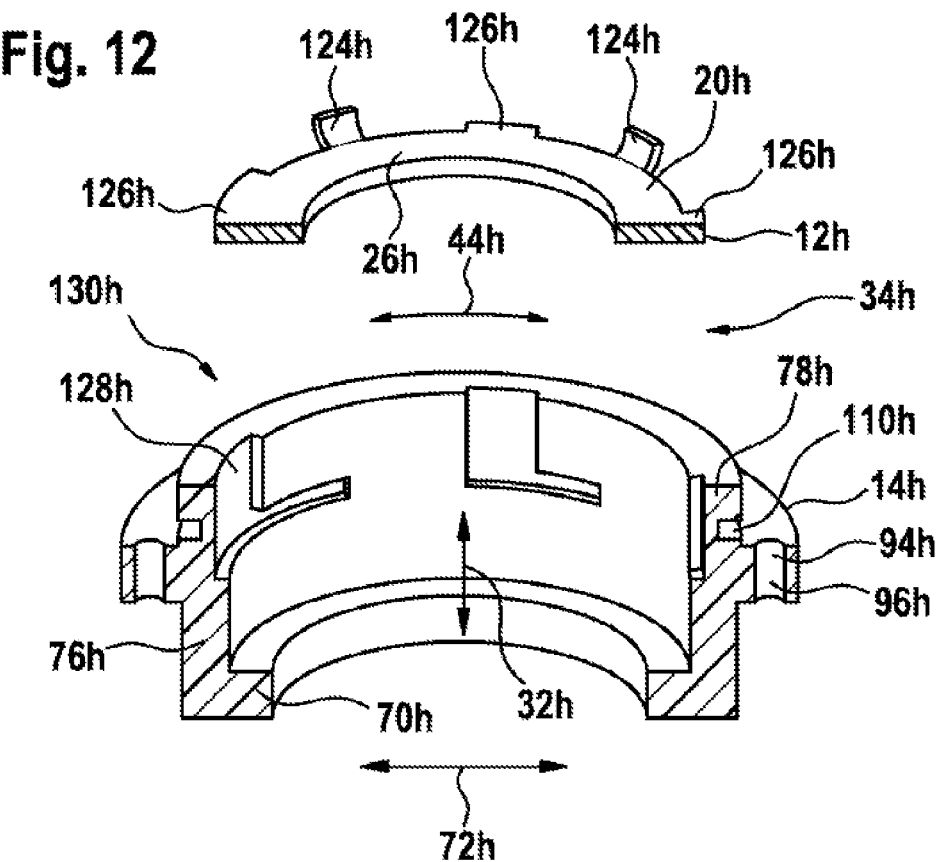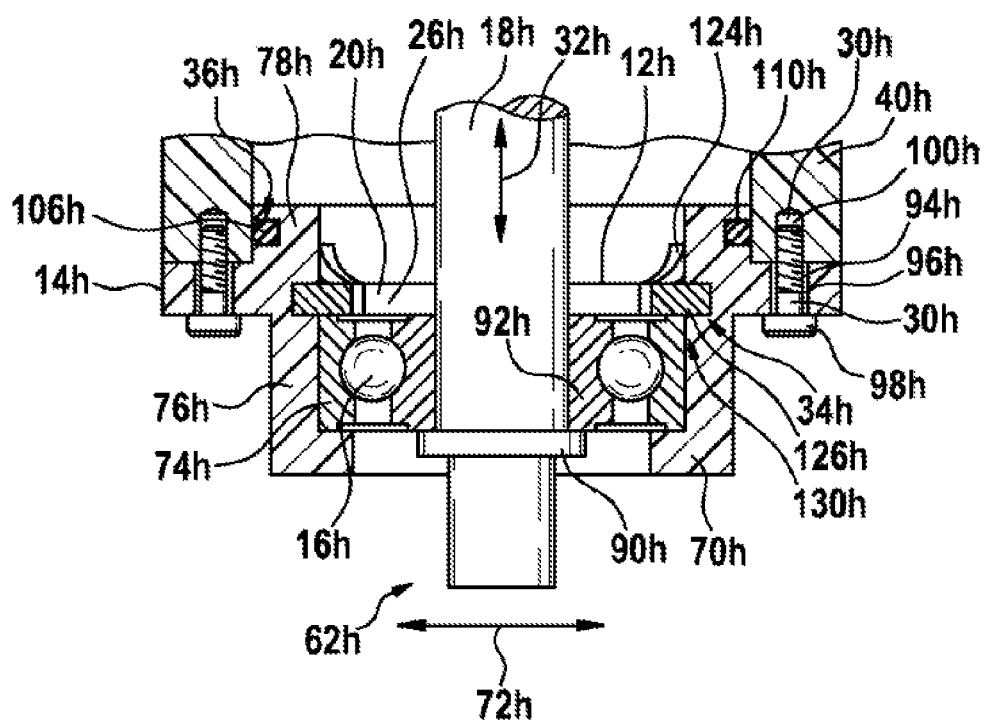

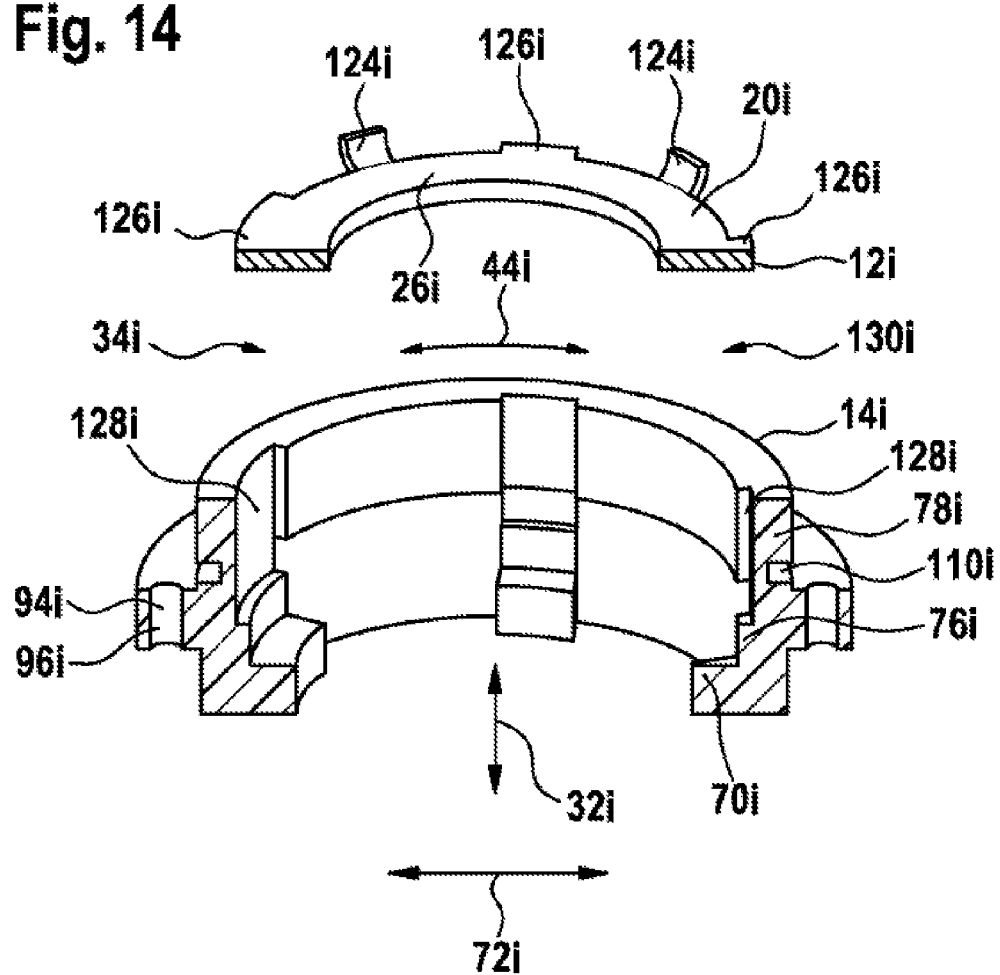

SHAFT BEARING DEVICE FOR A HAND-HELD POWER TOOL

This application is a 35 U.S.C. §371 National Stage Application of PCT/EP2011/059238, filed on Jun. 6, 2011, which claims the benefit of priority to Serial No. DE 10 2010 038 990.0, filed on Aug. 6, 2010 in Germany, the disclosures of which are incorporated herein by reference in their entirety.

BACKGROUND

A shaft bearing device for a hand-held power tool is already known, which consists of a first support unit made of aluminum and a second support unit in the form of a securing ring, which units are intended axially and/or radially to support a bearing element of a shaft.

SUMMARY

The disclosure takes as its starting point a shaft bearing device for a hand-held power tool, in particular for an angle grinder and/or a circular saw, having at least one first support unit and having at least one second support unit which are intended axially and/or radially to support a bearing element of a shaft.

It is proposed that at least one of the at least two support units is formed at least partially and preferably in its entirety by a plate element having at least one axial and/or radial bend. The expression "support unit" should be understood to denote in particular a unit for an axial and/or radial support for the bearing element of the shaft, which support is intended in particular to receive the bearing element directly, wherein preferably no surface of the support unit is intended to serve as a sliding contact bearing surface and/or a rolling contact bearing surface. The expression "plate element" should be understood to denote in particular a spatial element, which, when observed in a bend in one plane, exhibits an out-of-round cross-sectional surface in a cross section perpendicular to the plane, and exhibits in particular perpendicular to the plane an at least essentially constant material thickness, which is less than 50%, preferably less than 25% and especially preferably less than 10% of the extent of a surface of the spatial element parallel to the plane and, in particular, of the smallest extent of a surface of the element parallel to the plane. In particular, the plate element exhibits a material thickness which is less than 1 cm. The plate element can be produced in particular from a flat base body, preferably by forming. The expression "axial bend" should be understood to denote in particular a change in the direction of extent of the plate element in an axial direction, when the plate element is observed in the direction of a radially outer end facing away from an axis of rotation of the shaft bearing device towards a radially inner end of the plate element facing towards the axis of rotation of the shaft bearing device, whereby the change in the direction of extent in its entirety is preferably greater than 45° and is preferably greater than 70°. The expression "axial direction" should be understood to denote in particular a direction which runs parallel to the axis of rotation of the shaft bearing device. The expression "radial bend" should be understood to denote in particular a change in the direction of extent of the plate element in a radial direction, when the plate element is observed in the direction of a radially outer end facing away from the axis of rotation of the shaft bearing device towards a radially inner end of the plate element facing towards the axis of rotation of the shaft bearing device, whereby the change in the direction of extent in its entirety is preferably greater than 45° and is preferably greater than 70°. The expression "radial direction" should be understood to denote in particular a direction which extends from the axis of rotation of the shaft bearing device, which preferably coincides with a rotational axis of the shaft, perpendicularly to said rotational axis of the shaft.

An advantageously compact configuration of the support unit for the shaft bearing device can be achieved through the at least one axial and/or radial bend in the plate element. An advantageous adaptation of the plate element to adjoining components, in particular to the bearing element, can be achieved, as well as a preferred saving in the installation space, in particular in the radial direction. The bearing element for the shaft can be arranged in any manner that appears reasonable to a person skilled in the art. It is particularly preferable, however, for the bearing element to be in the form of a rolling contact bearing, in particular in the form of a ball deep groove bearing.

An accurate adaptation of the plate element to components of the hand-held power tool arranged radially inside the plate element and a very compact configuration of the shaft bearing device can be achieved if the plate element exhibits at least two axial and/or radial bends. The expression "radially inside" the plate element should be understood to denote in particular a region and/or an installation space, which, when observed in the radial direction from the axis of rotation of the shaft bearing device, is arranged at least partially ahead of the plate element. The plate element preferably exhibits three or, particularly preferably, even four axial and/or radial bends, whereby an adaptation of the plate element to the components arranged radially inside the plate element can be improved beneficially.

Also proposed is a shaft bearing device for a hand-held power tool, in particular for an angle grinder and/or a circular saw, having at least one first support unit and having at least one second support unit which are intended axially and/or radially to support a bearing element of a shaft, whereby at least one of the at least two support units is formed at least partially from plastic. An advantageously light and in particular cost-effective support unit can be achieved in this way. The expression "a first and a second support unit" should be understood in this context to denote in particular two components that are executed separately from one another and, in particular, can be separated in a non-destructive manner.

It is proposed that the shaft bearing device exhibits the bearing element which is executed separately from the support unit which is formed from plastic. The expression "separately" should be understood to denote in particular that the bearing element and the support unit that is formed from plastic are executed in particular as components that can be separated in a non-destructive manner. A shaft bearing device can be achieved in this way, in which the bearing element can be replaced individually and particularly advantageously in the event of its wearing, whereby a beneficial saving in the costs of a replacement part can be made. In addition, the bearing element can be replaced by any geometrically compatible bearing element, regardless of the manufacturer of the hand-held power tool, whereby high flexibility can be achieved.

It is proposed, furthermore, that at least one of the at least two support units is formed from a sheet metal part. The expression "sheet metal part" should be understood to denote in particular a plate element that is executed from a metal. The use of a sheet metal part exhibits the advantage that the at least one support unit can be executed in a particularly light and installation space-saving, and yet advantageously stable, manner. Advantageously cost-effective manufacturing of the support unit can be achieved in addition.

In a further embodiment of the disclosure, it is proposed that the shaft bearing device exhibits at least one attachment unit executed separately from the at least two support units, which is intended to connect the at least two support units together. The expression "connect" should be understood in this context to denote in particular that the two support units are attached by means of the attachment unit with a form-locking connection and/or in particular with a force-locking connection. The attachment unit, which is executed separately from the support units, offers the advantage that the attachment unit can be of particularly simple configuration and can accordingly be manufactured cost-effectively. In addition, the attachment unit can be replaced individually in the event of its wearing, whereby the replacement of an at least essentially intact subassembly can be avoided, thereby enabling savings in costs to be made. The attachment unit preferably comprises at least one attachment element formed from a screw and/or from a recess with an internal thread. However, any other attachment unit that appears reasonable to a person skilled in the art is also conceivable.

It is proposed in addition that the attachment unit exhibits at least one attachment element, which, in its assembled state, extends through the at least two support units at least in an axial direction. Installation space can be saved advantageously by the arrangement according to the disclosure, in particular in the radial direction and/or in the axial direction. Advantageous securing of the support units can be achieved in addition, and slipping of the at least two support units relative to one another and relative to a gearbox housing can be reliably prevented.

The shaft bearing device preferably comprises at least one attachment unit intended for releasable connection, which is configured as a bayonet fixing. The expression "bayonet fixing" should be understood to denote in particular a unit having at least two fixing elements, whereby, in particular in an insertion process, a formation on the first attachment element is passed through a recess in the second attachment element and past a formation on the second attachment element, before being guided upon subsequent rotation behind the formation on the second attachment element, thereby achieving a form-locking connection in the direction of insertion. A particularly advantageously simple and, in particular, tool-free connection between the at least two support units can be achieved by the configuration of the attachment unit as a bayonet fixing.

In a further embodiment of the disclosure, it is proposed that the shaft bearing device exhibits at least one sealing unit, which is arranged in a radially inner region of at least one of the at least two support units. Advantageous sealing of the bearing element, in particular against dust and/or dirt which is encountered in particular in an operating state of the hand-held power tool, can be achieved by the sealing unit according to the disclosure. The sealing unit can advantageously comprise at least one sealing element, which can preferably be executed as a felt ring, whereby the sealing unit can be configured in a particularly simple, advantageously cost-effective and robust manner. The sealing unit can also be produced from any other materials that appear reasonable to a person skilled in the art, in particular such as an elastomer. The sealing unit can preferably be firmly connected to one of the at least two support units in a force-locking and/or material-locking and/or form-locking manner prior to the assembly of the support unit into a hand-held power tool. Particularly advantageous sealing of the bearing element can be achieved by a sheet metal disk, which is arranged in the axial direction between the bearing element and the sealing unit. The expression "sheet metal disk" should be understood to denote in particular a component made of metal, the material extent of which in at least one radial direction amounts to at least 10% of at least one overall extent, in particular such as a diameter, of the component in at least one radial direction, whereby a material extent of the component in the axial direction preferably amounts to less than 10% of at least one overall extent of the component in at least one radial direction. It is also conceivable to provide an advantageously small distance from at least one support unit to a support flange on the shaft in an axial and/or radial direction, which distance is able reliably to be prevented the ingress of dirt and/or dust, so that an advantageously simple sealing of the bearing element against dirt and/or dust can be achieved.

It is also proposed that at least one of the at least two support units exhibits at least one first centering element for the centering of at least one of the at least two support units on a gearbox housing of the hand-held power tool and at least one second centering element for centering the bearing element of the shaft on at least one further support unit. Advantageously simple and precise centering of at least one of the at least two support units and the bearing element can be achieved by means of the centering elements, and an assembly process can be advantageously facilitated. The centering elements are preferably in the form of sheet metal brackets, which are executed integrally with the plate element formed from the sheet metal part. The expression "sheet metal bracket" in this context should be understood to denote in particular a part of the plate element which is bent out from a principal extent plane of the plate element. The centering elements can thus be manufactured in an advantageously simple and cost-effective manner. Connecting elements configured as webs are preferably provided between the centering elements, which connecting elements form a diameter that is in particular smaller than a diameter which the centering elements form for the centering of the bearing element. The bearing element can be retained advantageously on the webs and can preferably be secured in the axial direction. It is also conceivable to execute the centering elements that are executed as sheet metal brackets as hook elements. The hook elements of the at least one support unit can preferably engage in recesses, which are provided in the other of the at least two support units. In addition to the advantages that have already been mentioned, an advantageous securing of the at least two support units to one another in the axial direction, and preferably also of an accessory unit to the at least two support units in the axial direction, can be achieved in an advantageously simple manner in this way.

In a further embodiment of the disclosure, it is proposed that at least one of the at least two support units exhibits a receiving region that is profiled in a circumferential direction, which extends in the circumferential direction of the at least one support unit and is intended to receive at least essentially one accessory unit in a form-locking manner. The expression "a receiving region that is profiled in a circumferential direction" should be understood in this context to denote in particular a region which, in a sectional view, exhibits a contour which deviates from a circular contour in a plane lying parallel to the radial direction. A robust and torsionally rigid holder for the accessory unit can be achieved by this in an advantageously simple and cost-effective manner.

In addition, a system is proposed having a shaft bearing device and at least one further support unit differing from the at least two support units, which, alternatively to at least one of the at least two support units, is adapted to be connected to the other of the at least two support units. The accessory unit for the hand-held power tool can preferably be provided on the at least one further support unit differing from the at least two support units. A plurality of different hand-held power tools can be achieved through the system according to the disclosure, whereby an advantageously large number of component parts of the hand-held power tool can be adopted unchanged. Particularly advantageously design cost savings and also savings in manufacturing costs can be achieved in this way. The accessory unit can preferably comprise a protective cover, an abutment and/or a locking lever and/or a clamping lever.

BRIEF DESCRIPTION OF THE DRAWINGS

Further advantages can be appreciated from the following description of the drawing. Nine illustrative embodiments of the disclosure are depicted in the drawing. The drawing, the description and the claims contain a large number of characterizing features in combination. A person skilled in the art will appropriately also consider the characterizing features individually and will assemble them into reasonable further combinations.

In the drawings:

FIG. 4 depicts a detail of a further illustrative embodiment of a shaft bearing device according to the disclosure as a schematic, perspective sectional representation;

FIG. 5 depicts a detail of a further illustrative embodiment of a shaft bearing device according to the disclosure as a schematic sectional representation;

FIG. 12 depicts two support units of a further illustrative embodiment of a shaft bearing device according to the disclosure in a non-assembled state as a schematic, perspective sectional representation;

FIG. 13 depicts a detail of the shaft bearing device according to the disclosure as a schematic sectional representation, and FIG. 14 depicts two support units of a further illustrative embodiment of a shaft bearing device according to the disclosure in a non-assembled state as a schematic, perspective sectional representation.

DETAILED DESCRIPTION

Figure 1:
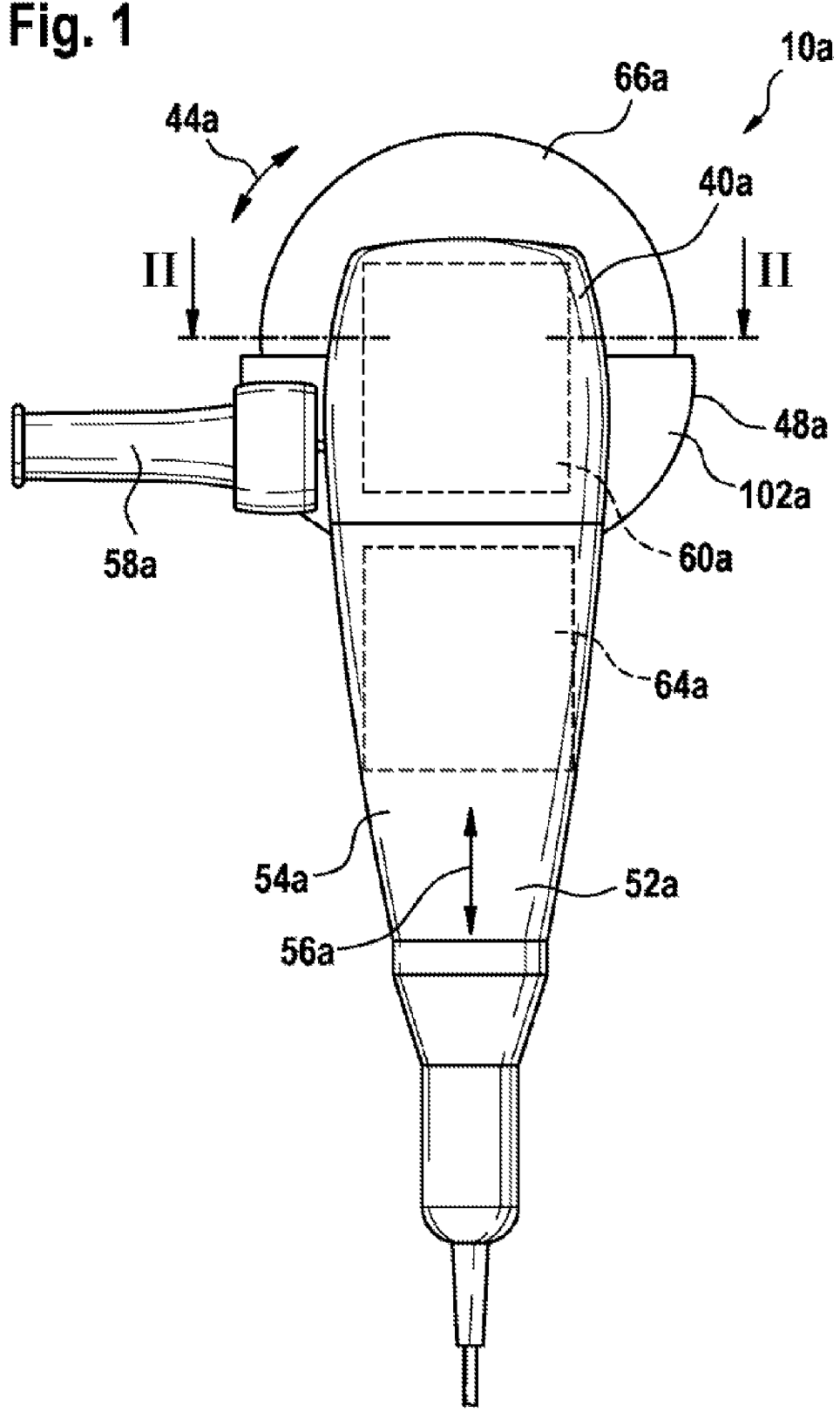
FIG. 1 depicts a hand-held power tool according to the disclosure as a view from above.

FIG. 1 depicts a hand-held power tool 10a executed as an angle grinder having a main handle 54a in the form of a motor housing 52a, which main handle extends in a principal direction of extension 56a of the hand-held power tool 10a, and having an additional handle 58a arranged on a gearbox housing 40a, which additional handle extends perpendicularly to the principal direction of extension 56a of the hand-held power tool 10a and perpendicularly to an axial direction 32a. The gearbox housing 40a accommodates a gearbox unit 60a, which is not described in more detail here, and is attached to the motor housing 52a in a region of the hand-held power tool 10a facing towards a tool holder 62a perpendicularly to the principal direction of extension 56a of the hand-held power tool 10a. A drive unit 64a, which is not described in more detail here, in the form of an electric motor is arranged in a radially inner region of the motor housing 52a. The tool holder 62a is provided in order to receive an insertable tool 66a, in particular a grinding disk or a cutting disk.

Figure 2:
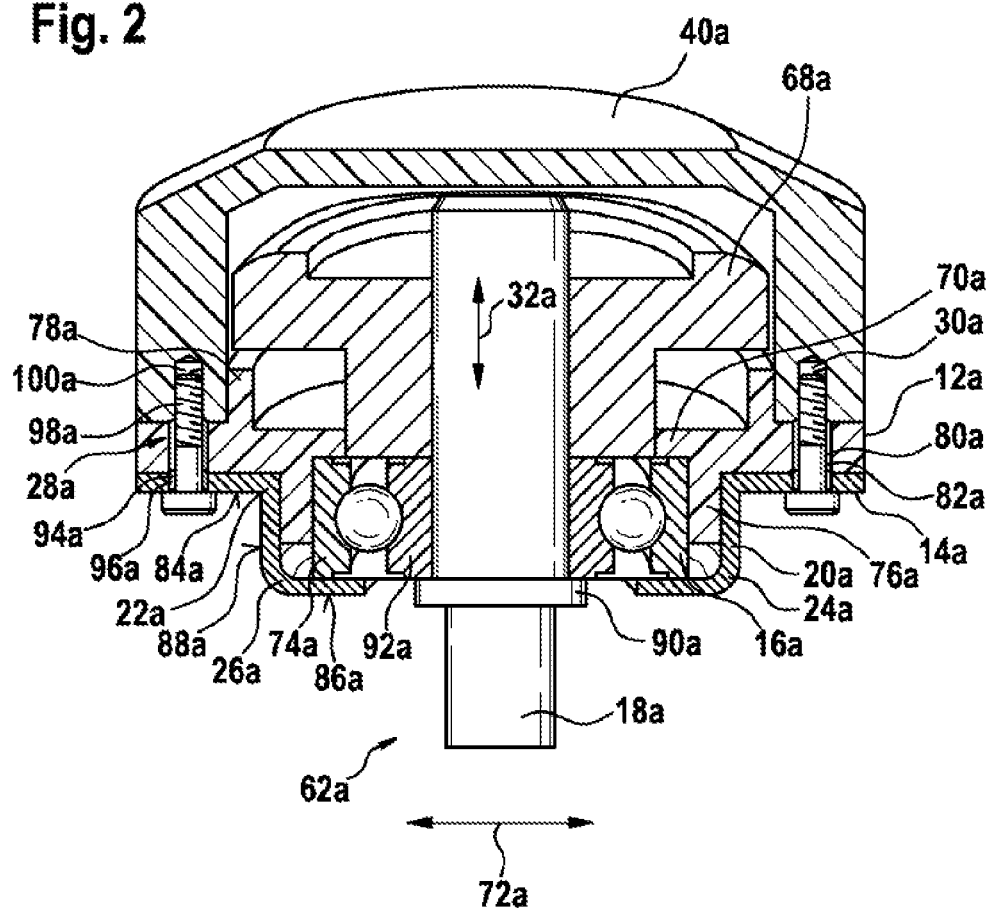
FIG. 2 depicts a detail of a perspective sectional representation of the hand-held power tool along an intersection line II-II with a shaft bearing device according to the disclosure.

FIG. 2 depicts a section through the gearbox housing 40a along the line II-II. The gearbox unit 60a exhibits a shaft 18a, which extends in an axial direction 32a through the gearbox housing 40a and projects from the gearbox housing 40a on a side of the gearbox housing 40a facing towards the tool holder 62a. One end of the shaft 18a, which projects from the gearbox housing 40a, exhibits the tool holder 62a. A gear wheel 68a executed in the form of a crown wheel is pressed onto the shaft 18a at one end of the shaft 18a facing away from the tool holder 62a, which gear wheel forms part of an angle drive for the gearbox unit 60a.

In order to support the shaft 18a rotatably in the gearbox housing 40a, a shaft bearing device is provided with a first support unit 12a facing towards the gearbox unit 60a and with a second support unit 14a facing towards the tool holder 62a. The first and the second support unit 12a, 14a is intended to provide axial and radial support for a bearing element 16a executed as a rolling contact bearing, in which the shaft 18a is supported, and to secure it against slipping or falling out.

The first support unit 12a formed from a plastic exhibits for this purpose a support flange 70a, which extends in a plane parallel to a radial direction 72a, and which, in an assembled state, is arranged in front of the bearing element 16a in the axial direction 32a, when observed from the gearbox unit 60a towards the tool holder 62a. A fixed external ring 74a of the bearing element 16a bears against this support flange 70a in an assembled state and is supported in the axial direction 32a in relation to the gearbox unit 60a on the support flange 70a. In addition, the first support unit 12a exhibits a further support flange 76a, which in an assembled state extends from the first support unit 12a in the axial direction 32a towards the tool holder 62a. The bearing element 16a bears against the support flange 76a in the radial direction 72a and is supported on the support flange 76a in the radial direction 72a. In an operating state of the hand-held power tool 10a, forces acting on the shaft 18a in the radial direction 72a are transmitted by the bearing element 16a to the first support unit 12a. The first support unit 12a additionally exhibits a centering collar 78a extending in an axial direction 32a from the first support unit 12a to the gearbox housing 40a, via which collar the first support unit 12a is supported on an inner side of the gearbox housing 40a and is centered relative to the gearbox housing 40a. The force acting in the radial direction 72a can be transmitted by this means in the radial direction 72a by the first support unit 12a to the gearbox housing 40a and can be absorbed by it. In addition, the first support unit 12a exhibits recesses 82a executed as axial channels 80a uniformly distributed over a periphery of the first support unit 12a, which channels are arranged radially outside the centering collar 78a of the first support unit 12a.

The second support unit 14a comprises a plate element 20a in the form of a sheet metal part 26a having an axial bend and a radial bend 22a, 24a. The sheet metal part 26a exhibits two annular surfaces 84a, 86a, each of which extends in a plane oriented perpendicularly in relation to the axial direction 32a. The expression "annular surface" should be understood in this context to denote a surface which is enclosed by two concentrically arranged circles.

The second annular surface 86a supports the bearing element 16a executed as a rolling contact bearing, in which the shaft 18a is rotatably supported, on the fixed outer ring 74a of the bearing element 16a in the axial direction 32a towards the tool holder 62a. Also provided on the shaft 18a is a support flange 90a, which supports an inner ring 92a rotating together with the shaft 18a of the bearing element 16a executed as a rolling contact bearing in the axial direction 32a towards the tool holder 62a.

The first annular surface 84a is arranged after the second annular surface 86a in the axial direction 32a, when observed from the tool holder 62a towards the gearbox unit 60a. The first annular surface 84a bears against the first support unit 12a made of plastic in the axial direction 32a and exhibits openings 96a executed as axial channels 94a and distributed around the periphery of the annular surface 84a. The first annular surface 84a and the second annular surface 86a are connected to one another by means of a region of the second support unit 14a extending in the axial direction 32a. The region extending in the axial direction 32a forms a cylindrical envelope surface 88a of the second support unit 14a.

Also provided is an attachment unit 28a that is executed separately from the support units 12a, 14a, which comprises attachment elements 30a in the form of screws 98a and openings 100a corresponding to the screws 98a having an internal thread in the gearbox housing 40a. In an assembled state of the support units 12a, 14a, the openings 82a, 96a of the first and the second support unit 12a, 14a and the attachment elements 30a executed as openings 100a are arranged lying one after the other in the axial direction 32a. The attachment elements 30a executed as screws 98a extend in the axial direction 32a through the openings 82a, 96a of the first and the second support unit 12a, 14a and are screwed into the openings 100a in the gearbox housing 40a. The first and the second support unit 12a, 14a are thus connected to one another and to the gearbox housing 40a of the hand-held power tool 10a in the axial direction 32a by means of the attachment elements 30a of the attachment unit 28a.

Figure 3A:
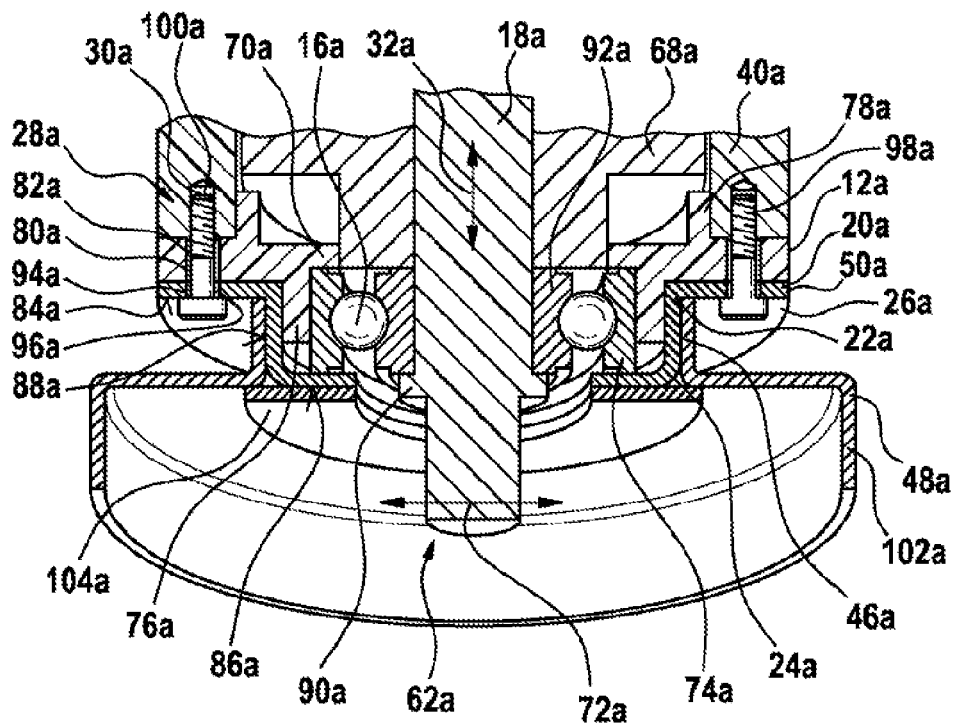
FIG. 3a depicts a detail corresponding to FIG. 2 having an alternative support unit for the shaft bearing device and a protective cover.

FIG. 3a depicts the shaft bearing device in FIG. 2, whereby the second support unit 14a is replaced by a further support unit 50a differing from the first and from the second support units 12a, 14a, which is connected to the first support unit 12a alternatively to the second support unit 14a in FIG. 2. The alternative support unit 50a is formed by a plate element 20a configured as a sheet metal part 26a and exhibits an axial bend and a radial bend 22a, 24a. A region adjoining the axial bend 22a of the alternative support unit 50a, which extends parallel to the axial direction 32a, forms a receiving region 46a on the alternative support unit 50a for an accessory unit 48a formed by a protective cover 102a. The protective cover 102a extends in a circumferential direction 44a of the alternative support unit 50a through an angular range of 180° and abuts against the receiving region 46a of the alternative support unit 50a extending parallel to an axial direction 32a, whereby a centering of the protective cover 102a is achieved. In addition, the protective cover 102a is secured by a disk 104a in the axial direction 32a against slipping of the protective cover 102a from the alternative support unit 50a. The disk 104a extends perpendicularly to the axial direction 32a and is connected to the alternative support unit 50a in a material-locking manner by means of a weld seam.

Figure 3B:
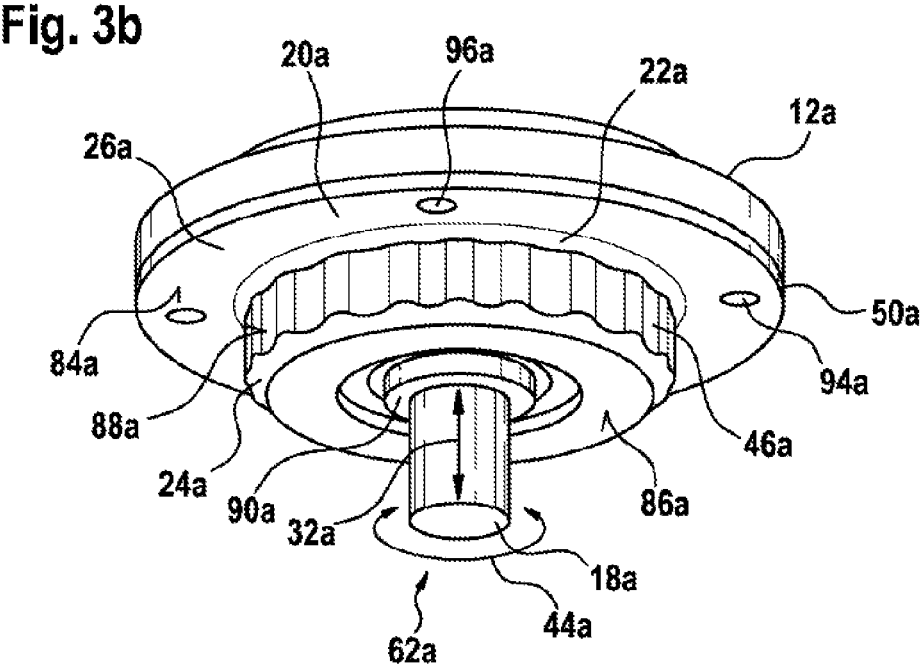
FIG. 3b depicts a schematic, perspective representation of the alternative support unit for the shaft bearing device according to the disclosure shown in FIG. 3a with the protective cover faded out.

FIG. 3b depicts the alternative support unit 50a without the accessory unit 48a formed by the protective cover 102a in an assembled state on the first support unit 12a. In order to secure the protective cover 102a against twisting in the circumferential direction 44a relative to the alternative support unit 50a, the receiving region 46a is executed with an undulating surface in the circumferential direction 44a.

FIGS. 4, 5, 6, 7, 8 and 9, 10 and 11, FIGS. 12 and 13, and FIG. 14 depict alternative embodiments of the shaft bearing device for a hand-held power tool 10a-i, in particular for an angle grinder and/or a circular saw, having a first support unit 12a-i and a second support unit 14a-i. Essentially corresponding component parts and characterizing features are basically numbered with the same reference designations, whereby, for the purpose of distinguishing between the embodiments, the letters a (FIGS. 1 to 3b), b (FIG. 4), c (FIG. 5), d (FIG. 6), e (FIG. 7), f (FIGS. 8 and 9), g (FIGS. 10 and 11), h (FIGS. 12 and 13) and i (FIG. 14) are appended to the reference designations as a suffix. Reference can also be made to the description of the illustrative embodiment in FIGS. 1 to 3b in the case of characterizing features and functions which remain the same. The following description in FIGS. 4 to 14 is restricted essentially to the respective differences from the illustrative embodiment in FIGS. 1 to 3b.

FIG. 4 depicts a further illustrative embodiment of a shaft bearing device according to the disclosure. The shaft bearing device exhibits a first support unit 12b facing towards a gearbox unit 60b and a second support unit 14b facing towards a tool holder 62b, whereby the second support unit 14b is executed as a plate element 20b formed from a sheet metal part 26b having two axial bends 22b and having two radial bends 24b.

Arranged in a region of the second support unit 14b facing towards the tool holder 62b and situated radially internally is a sealing unit 36b, which comprises a sealing element 106b executed as a felt ring. The sealing element 106b abuts against the radial bend 24b extending perpendicularly to an axial direction 32b and facing towards the tool holder 62b, and against an axial bend 22b of the second support unit 14b extending parallel to the axial direction 32b and facing towards the tool holder 62b. Arranged in front of the sealing element 106b in the axial direction 32b, when observed from the gearbox unit 60b towards the tool holder 62b, is a thin sheet metal disk 108b, by means of which the sealing element 106b is supported on a bearing element 16b of a shaft 18b executed as a rolling contact bearing. The sealing element 106b executed as a felt ring is arranged radially outside a support flange 90b of the shaft 18 and is retained between this and the axial bend 22b of the second support unit 14b facing towards the tool holder 62b in a radial direction 72b.

FIG. 5 depicts a further embodiment of a shaft bearing device according to the disclosure. The shaft bearing device exhibits a first support unit 12c facing towards a gearbox unit 60c, which support unit is executed as a flat, disk-shaped plate element 20c. The plate element 20c in this case is formed by a sheet metal part 26c. In addition, the shaft bearing device comprises a second support unit 14c made of plastic, which is arranged behind the first support unit 12c in an axial direction 32c, when observed from the gearbox unit 60c towards a tool holder 62c. Both support units 12c, 14c are connected to one another by means of an attachment unit 28c, which comprises attachment elements 30c, and are attached to the gearbox housing 40c of the hand-held power tool 10c. The attachment elements are in the form of screws 98c and openings 100c corresponding to the screws 98c having an internal thread in a gearbox housing 40c. The screws 98c and the openings 100c with an internal thread are distributed uniformly over a periphery of the support units 12c, 14c.

The second support unit 14c made of plastic exhibits a support flange 70c, which supports a bearing element 16c configured as a rolling contact bearing, which bearing element is intended to support a shaft 18c rotatably relative to the gearbox housing 40c, when observed in the axial direction 32c from the gearbox unit 60c towards the tool holder 62c, on an outer ring 74c of the bearing element 16c. The bearing element 16c is additionally supported in the axial direction 32c, when observed from the gearbox unit 60c towards the tool holder 62c, on an inner ring 92c of the bearing element 16c by a support flange 90c, which is arranged on the shaft 18c. The bearing element 16c is supported in the axial direction 32c, when observed from the tool holder 62c towards the gearbox unit 60c, by the first support unit 12c on the outer ring 74c of the bearing element 16c.

The second support unit 14c also exhibits an abutment 110c, which is arranged in the axial direction 32c, when observed from the gearbox unit 60c towards the tool holder 62c, in front of the support flange 70c of the second support unit, in order to support the bearing element in the axial direction 32c. The abutment 110c of the second support unit 14c extends in a circumferential direction 44c of the second support unit 14c and is intended to accommodate a sealing unit 36c, which comprises a sealing element 106c executed as an O-ring.

Figure 6:
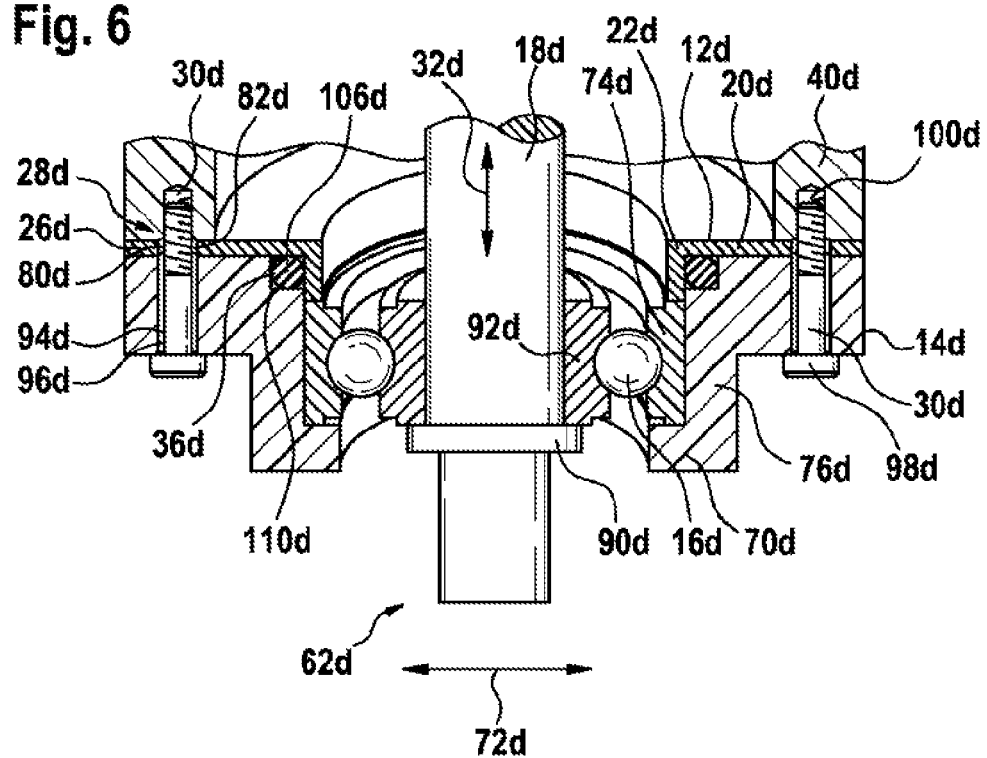
FIG. 6 depicts a detail of a further illustrative embodiment of a shaft bearing device according to the disclosure as a schematic sectional representation.

A shaft bearing device depicted in FIG. 6 corresponds essentially to the shaft bearing device in FIG. 5. A first support unit 12d facing towards a gearbox unit 60d is formed in this case by a plate element 20d formed as a sheet metal part 26d having an axial bend 22d. A second support unit 14d facing towards a tool holder 62d corresponds essentially to the second support unit 14c depicted in FIG. 5.

Figure 7:
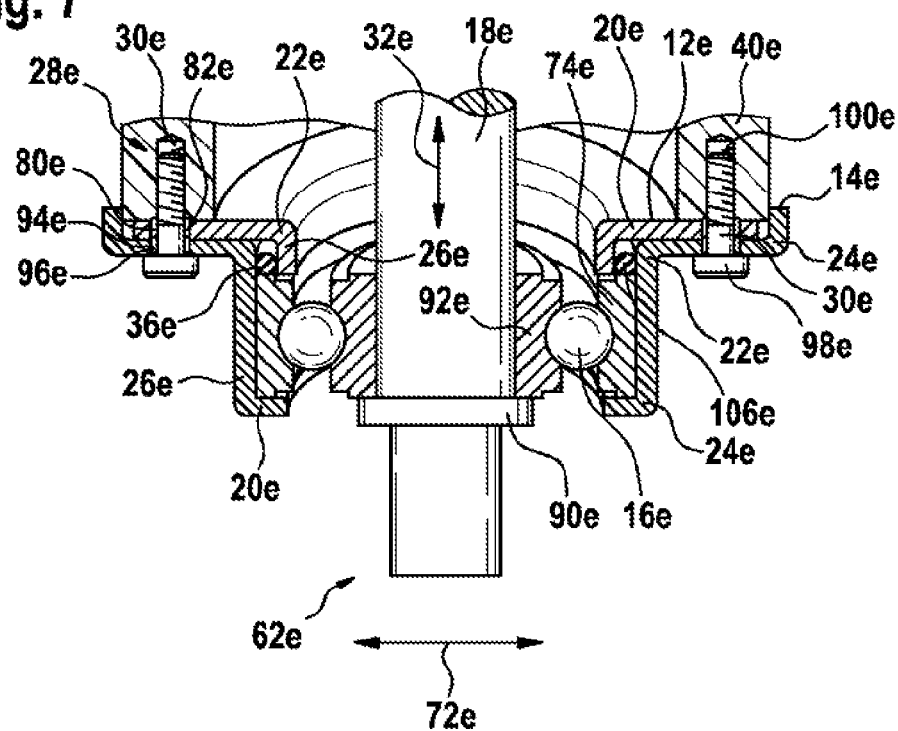
FIG. 7 depicts a detail of a further illustrative embodiment of a shaft bearing device according to the disclosure as a schematic sectional representation.

FIG. 7 depicts a shaft bearing device with a first support unit 12e with an axial bend 22e facing towards a gearbox unit 60e and formed from a plate element 20e executed as a sheet metal part 26e. The first support unit 12e corresponds at least essentially to the first support unit 12d of the shaft bearing device depicted in FIG. 6. In addition, a second support unit 14e facing towards a tool holder 62e is provided, which is formed by a plate element 20e executed as a sheet metal part 26e having one axial bend 22e and two radial bends 24e. A region of the second support unit 14e, which is oriented perpendicularly to an axial direction 32e and faces towards the tool holder 62e, secures a bearing element 16e of a shaft 18e in the axial direction 32e in relation to the tool holder 62e. A sealing unit 36e is arranged in a radially inner region of the second support unit 14e. The sealing unit 36e comprises a sealing element 106e formed by an O-ring. The sealing element 106e is arranged in front of the bearing element 16e in the axial direction 32e, when observed from the gearbox unit 60e towards the tool holder 62e. The sealing element 106e executed as an O-ring extends radially outside a region of the first support unit 12e, which is oriented parallel to the axial direction 32e and adjoins the axial bend 22e of the first support unit 12e.

Figure 8:
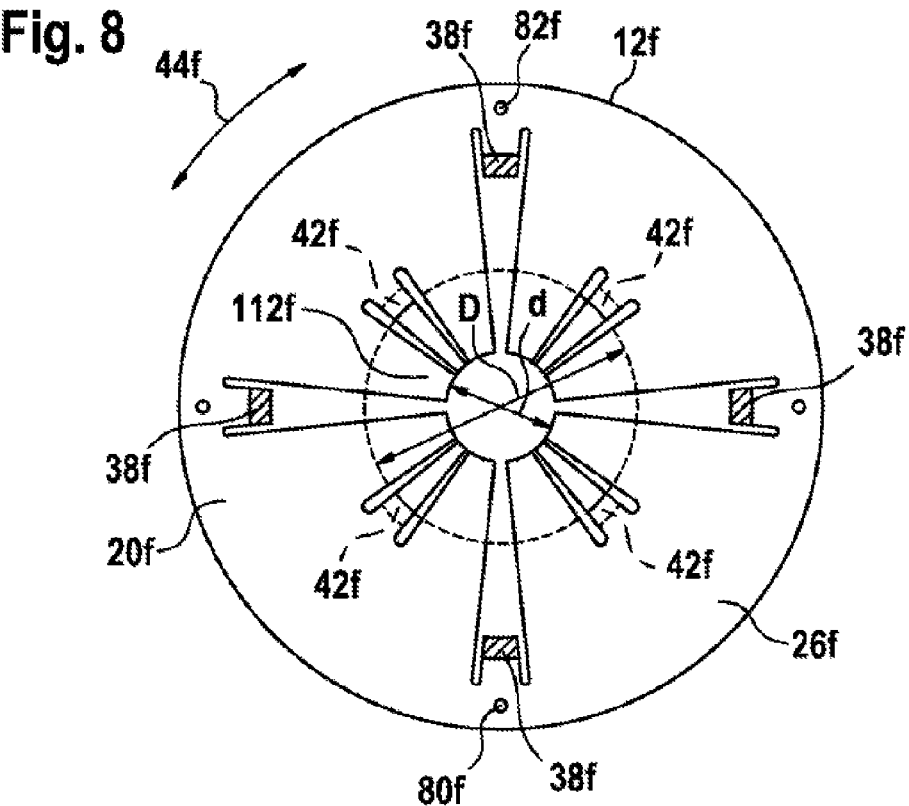
FIG. 8 depicts a schematic sectional representation of a support unit of a further illustrative embodiment for a shaft bearing device according to the disclosure as a view from above.
Figure 9:
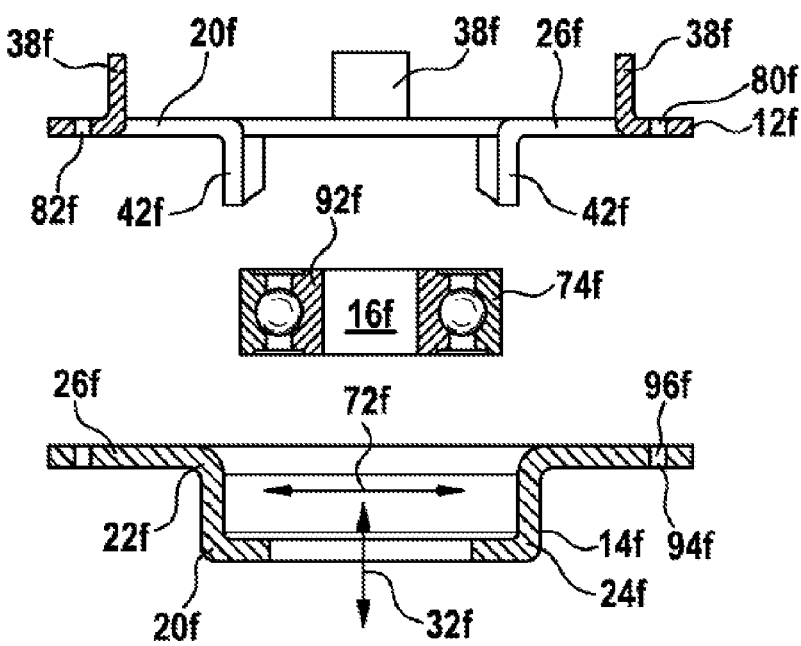
FIG. 9 depicts the shaft bearing device according to the disclosure in a non-assembled state as a schematic, perspective sectional representation.

FIGS. 8 and 9 depict a further illustrative embodiment of a shaft bearing device according to the disclosure for a hand-held power tool 10f having a first support unit 12f facing towards a gearbox unit 60f, and having a second support unit 14f facing towards a tool holder 62f, which are intended to support a bearing element 16f of a shaft 18f executed as a rolling contact bearing. The first and the second support unit 12f, 14f are each formed from a plate element 20f executed as a sheet metal part 26f. The first support unit 12f formed from a sheet metal part 26f exhibits four centering elements 38f distributed uniformly in a circumferential direction 44f, which are intended to provide centering of the first support unit 12f in a gearbox housing 40f. The centering elements 38f are formed from sheet metal brackets, which extend in an axial direction 32f from the first support unit 12f towards the gearbox unit 60f. In addition, the first support unit 12f exhibits four further centering elements 42f, which are uniformly distributed in the circumferential direction 44f and are arranged offset by 45° relative to the centering elements 38f for the purpose of centering the first support unit 12f in the gearbox housing 40f in a circumferential direction. The further centering elements 42f are also executed as sheet metal brackets, which extend in the axial direction 32f from the first support unit 12f to the tool holder 62f. The four further centering elements 42f are intended to center the bearing element 16f relative to the first support unit 12f. Forces acting in a radial direction 72f are transmitted via the further centering elements 42f in a radial direction 72f to the gearbox housing 40f of the hand-held power tool 10f and are absorbed by it.

Provided between the four further centering elements 42f for centering the bearing element 16f of the shaft 18f are connecting elements 112f in the form of webs, which form a diameter d that is smaller than a diameter D formed by the centering elements 42f for centering the bearing element 16f. The connecting elements 112f are arranged in the circumferential direction 44f about the shaft 18f in a plane oriented perpendicularly to the axial direction 32f and secure the bearing element 16f in the axial direction 32f to the gearbox unit 60f.

The second support unit 14f exhibits an axial bend 22f and a radial bend 24f. A region of the second support unit 14f facing towards the gearbox unit 60f in the axial direction 32f, which extends perpendicularly to the axial direction 32f, bears against the first support unit 12f in the axial direction 32f in an assembled state and is connected to the first support unit 12f by means of an attachment unit 28f and is secured to the gearbox housing 40f. The attachment unit 28f comprises attachment elements 30f, which are in the form of screws 98f and openings 100f corresponding to the screws 98f in each case having an internal thread in the gearbox housing 40f. The attachment elements 30f are uniformly distributed over a periphery of the support units 12f, 14f and of the gearbox housing 40f.

A further region of the second support unit 14f also extends perpendicularly to the axial direction 32f and is arranged facing towards the tool holder 62f in the axial direction 32f. This further region is intended to secure the bearing element 16f in the axial direction 32f towards the tool holder 62f via an outer ring 74f of the bearing element 16f. A region of the second support unit 14f oriented parallel to the axial direction 32f, which forms an envelope surface 88f, connects the regions of the second support unit 14f that are oriented parallel to the axial direction 32f and is intended to center the second support unit 14 relative to the first support unit 12. For this purpose, the region of the second support unit 14f oriented parallel to the axial direction 32f bears against a radially external surface of the centering elements 42*f* for the purpose of centering the bearing element 16*f* of the first support unit 12*f*.

Figure 10:
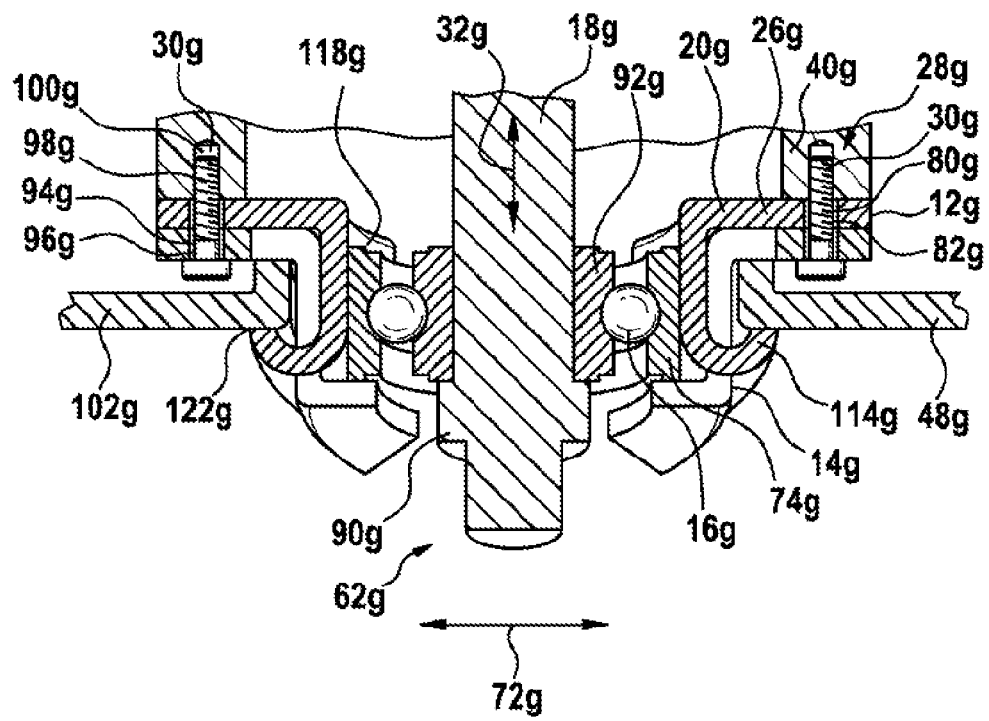
FIG. 10 depicts a detail of a further illustrative embodiment of a shaft bearing device according to the disclosure as a schematic sectional representation.
Figure 11:
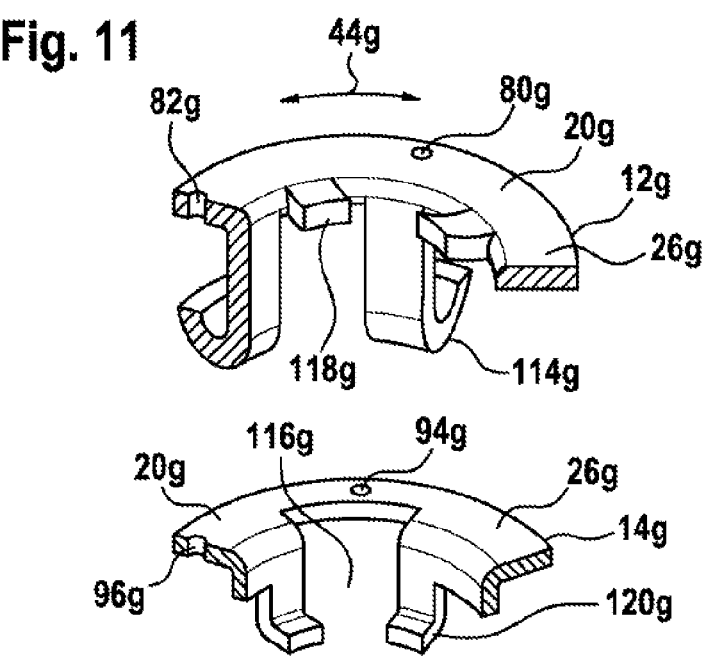
FIG. 11 depicts two support units for the shaft bearing device according to the disclosure in a non-assembled state as a schematic, perspective sectional representation.

Depicted in FIGS. 10 and 11 is a further illustrative embodiment of a shaft bearing device according to the disclosure with a first support unit 12*g* facing towards a gearbox unit 60*g* and a second support unit 14*g* facing towards a tool holder 62*g*. Both support units 12*g*, 14*g* are formed by a plate element 20*g*, which is executed in each case as a sheet metal part 26*g*. The first support unit 12*g* exhibits hook elements 114*g* distributed in a circumferential direction 44*g*, which support a bearing element 16*g* in a radial direction 72*g* towards the outside against a gearbox housing 40*g*. The hook elements 114*g* face towards the outside in the radial direction 72*g*. The hook elements 114*g* for the radial support of the bearing element 16*g* engage with hook-shaped ends facing towards the tool holder 62*g* through openings 116*g*, which are arranged uniformly distributed over a periphery of the second support unit 14*g*. The hook-shaped ends of the hook elements 114*g* project in a radial direction 72*g* through the openings 116*g* in the second support unit 14*g*.

The first support unit 12*g* exhibits further hook elements 118*g* distributed over the periphery of the first support unit 12*g*, which hook elements face inwards in the radial direction 72*g*. The hook elements 118*g* secure the bearing element 16*g* in the axial direction 32*g* to the gearbox unit 60*g*.

The second support unit 14*g* similarly exhibits hook elements 120*g* that are uniformly distributed over the periphery of the second support unit 14*g*, which hook elements face inwards in the radial direction 72*g*. The hook elements 120*g* with hook-shaped ends of the hook elements 120*g* facing towards the tool holder secure the bearing element 16*g* in the axial direction 32*g* to the tool holder 62*g*.

In conjunction with the assembly of the shaft bearing device, the bearing element 16*g* is first pushed in between the hook elements 114*g* of the first support unit 12*g* in the axial direction 32*g*, when observed from the hook elements 118*g* facing outwards in the radial direction 72*g* towards the hook elements 120*g* facing inwards in the radial direction 72*g*. The second support unit 14*g* is then pushed onto the first support unit 12*g*. The hook elements 114*g* of the first support unit 12*g* in this case are passed through the openings 116*g* in the second support unit 14*g*. A shaft 18*g* is pushed into the bearing element 16*g*, which is retained in the axial direction 32*g* between the first and the second support unit 12*g*, 14*g*, in the axial direction 32*g*, when observed from hook elements 118*g* facing outwards in the radial direction 72*g* towards hook elements 120*g* facing inwards in the radial direction 72*g*. A gear wheel 68*g* executed in the form of a crown wheel is then pressed onto the shaft 18*g*. The first and the second support unit 12*g*, 14*g* are then secured to the gearbox housing 40*g* together with the shaft 18*g* retained therein by means of an attachment unit 28*g*. The attachment unit 28*g* exhibits attachment elements 30*g*. The attachment elements 30*g* are in the form of screws 98*g* and openings 100*g* corresponding to the screws 98*g*, in each case with an internal thread. The screws 98*g* extend in an assembled state in the axial direction 32*g* through openings 82*g*, 96*g* formed by axial channels 80*g*, 94*g* in the first and the second support units 12*g*, 14*g*.

An accessory unit 48*g* in the form of a protective cover 102*g* can also be connected to the shaft bearing device. The protective cover 120*g* exhibits openings for this purpose, which are arranged on a side of the protective cover 102*g* facing towards the tool holder 62*g*. The openings exhibit first regions extending parallel to the axial direction 32*g* and second regions executed as a groove. The second region extends in a circumferential direction 44*g*. The hook-shaped ends of the hook elements 118*g* are passed through the first regions of the openings in the protective cover 102*g* in the axial direction 32*g* during an assembly process for the protective cover 102*g*. The hook-shaped ends of the hook elements 118*g* are guided into the slots that are oriented perpendicularly to the first regions of the openings by a rotary motion of the protective cover 102*g* relative to the first support unit 12*g* and are secured in the axial direction 32*g* to the gearbox unit 60*g* and to the tool holder 62*g*. The openings in the protective cover 102*g* and the hook-shaped ends of the hook elements 118*g* of the first support unit form a bayonet fixing 122*g*.

FIGS. 12 and 13 depict a further illustrative embodiment of a shaft bearing device according to the disclosure. The shaft bearing device exhibits a first support unit 12*h* facing towards a gearbox unit 60*h* and a second support unit 14*h* facing towards a tool holder 62*h*. The first support unit 12*h* is formed by a plate element 20*h* formed by a sheet metal part 26*h*. The sheet metal part 26*h* exhibits centering elements 124*h*, which are formed by sheet metal brackets. The centering elements 124*h* are provided in order to center the first support unit 12*h* relative to the second support unit 14*h*. The centering elements 124*h* executed as sheet metal brackets extend parallel to an axial direction 32*h* from the first support unit 12*h* towards the gearbox unit 60*h*. The centering elements 124*h* are arranged uniformly distributed over a periphery of the first support unit 12*h*. In addition, the first support unit 12*h* formed by the sheet metal part 26*h* exhibits retaining elements 126*h*. The retaining elements 126*h* are formed from sheet metal brackets. The retaining elements 126*h* are arranged in a plane extending perpendicularly to the axial direction 32*h*. The retaining elements 126*h* are arranged uniformly distributed over the periphery of the first support unit 12*h*. The first support unit 12*h* secures a bearing element 16*h* of a shaft 18 executed as a rolling contact bearing in the axial direction 32*h* to the gearbox unit 60*h*.

The second support unit 14*h* is made of plastic and is supported in the axial direction 32*h* against a gearbox housing 40*h*, when observed from the tool holder 62*h* towards the gearbox unit 60*h*. The second support unit 14*h* exhibits a support flange 70*h*, which secures the bearing element 16*h* in the axial direction 32*h* to the tool holder 62*h*. The second support unit 14*h* exhibits a centering collar 78*h*. The centering collar 78*h* extends from the second support unit 14*h* to the gearbox unit 60*h* parallel to the axial direction 32*h*. The second support unit 14*h* exhibits a groove-shaped abutment 110*h*, which is arranged in a radially outer region of the centering collar 78*h*. In an assembled condition of the shaft bearing device, the abutment 110*h* accommodates a sealing unit 36*h*. The sealing unit 36*h* comprises a sealing element 106*h*, which is formed from an O-ring formed from an elastomer.

Furthermore, the second support unit 14*h* exhibits openings 128*h*, which exhibit first regions extending parallel to the axial direction 32*h* and second regions executed as a groove. The second region extends in a circumferential direction 44*h*. The retaining elements 126*h* of the first support unit 12*h* are guided during an assembly process through the first regions of the openings 128*h* of the second support unit 14*h* in an axial direction 32*h*. The retaining elements 126*h* are guided into the grooves that are oriented perpendicularly to the first regions of the openings 128*h* by a rotary motion of the support units 12*h*, 14*h* relative to one another and are secured in the axial direction 32*h* to the gearbox unit 60*h* and to the tool holder 62*h*.

The second support unit 14*h* is secured to a gearbox housing 40*h* by means of an attachment unit 28*h*. The attachment unit 28*h* exhibits attachment elements 30*h*. The attachment elements 30h are in the form of screws 98h and openings 100h corresponding to the screws 98h, in each case with an internal thread. The screws 98h extend in an assembled state in the axial direction 32h through openings 96h in the second support unit 14h formed by axial channels 94h.

The retaining elements 126h of the first support unit 12h and the openings 128h of the second support unit 14h form attachment elements of a further attachment unit 130h. The further attachment unit 130h is configured as a bayonet fixing 34h.

FIG. 14 depicts a further illustrative embodiment of a shaft bearing device according to the disclosure having a first support unit 12i facing towards a gearbox unit 60i and a second support unit 14i facing towards a tool holder 62i. The first support unit 12i corresponds essentially to the first support unit 12h depicted in FIG. 12 and in FIG. 13. The second support unit 14i made of plastic exhibits openings 128i having a first region, which extends parallel to an axial direction 32i, and having a second region, which is configured as a groove. A retaining element 126i of the first support unit 12i is guided through the first region of the openings 128i during an assembly process in the axial direction 32i from the gearbox unit 60i to the tool holder 62i. The first and the second support unit 12i, 14i are then rotated relative to one another in a circumferential direction 44i. In conjunction with this, the retaining elements 126i of the first support unit 12i are guided into the grooves, which extend perpendicularly to the first region of the openings 128i, and engage behind the grooves. The first and the second support unit 12i, 14i are connected to one another in the axial direction in this way.

The grooves in the openings 128i of the second support unit 14i are of open configuration in the axial direction 32i towards the tool holder 62i, so that the second support unit 14i can be manufactured by means of an injection molding process. The first regions of the openings 128i of the second support unit are formed by an injection molding tool in this case in the axial direction 32i from the gearbox unit 60i to the tool holder 62i. The grooves of the openings 128i of the second support unit 14i are formed by an injection molding tool in the axial direction 32i from the tool holder 62i towards the gearbox unit 60i.

The invention claimed is:

1. A shaft bearing device for a hand-held power tool, comprising:
 a shaft;
 a bearing element configured to support the shaft;
 at least one first support unit and at least one second support unit configured to one or more of axially support and radially support the bearing element; and
 at least one attachment unit configured to releasably connect the at least one first support unit and the at least one second support unit, the at least one attachment unit configured as a bayonet fixing,
 wherein at least one of the at least one first support unit and the at least one second support unit is formed at least partially by a plate element having one or more of at least one axial bend and at least one radial bend.

2. The shaft bearing device as claimed in claim 1, wherein the plate element has one or more of at least two axial bends and at least two radial bends.

3. The shaft bearing device as claimed in claim 1, wherein at least one of the at least one first support unit and the at least one second support unit is formed at least partially from plastic.

4. The shaft bearing device as claimed in claim 3, wherein the bearing element and the at least one of the at least one first support unit and the at least one second support unit that is formed from plastic are configured to be separated in a non-destructive manner.

5. The shaft bearing device as claimed in claim 1, wherein at least one of the at least one first support unit and the at least one second support unit is formed from a sheet metal part.

6. The shaft bearing device as claimed in claim 1, further comprising at least one attachment unit, wherein the at least one attachment unit and the at least one first support unit and the at least one second support unit are configured to be separated in a non-destructive manner, and wherein the at least one attachment unit is configured to connect the at least one first support unit and the at least one second support unit together.

7. The shaft bearing device as claimed in claim 6, wherein the at least one attachment unit includes at least one attachment element, which, in its assembled state, extends through the at least one first support unit and the at least one second support unit at least in an axial direction.

8. The shaft bearing device as claimed in claim 1, further comprising at least one sealing unit arranged in a radially inner region of at least one of the at least one first support unit and the at least one second support unit.

9. The shaft bearing device as claimed in claim 1, wherein at least one of the at least one first support unit and the at least one second support unit includes a receiving region that is (i) profiled in a circumferential direction extending in the circumferential direction of the at least one support unit and (ii) configured to receive at least essentially one accessory unit in a form-locking manner.

10. The shaft bearing device as claimed in claim 1, wherein the hand-held power tool is an angle grinder or a circular saw.

11. A shaft bearing device for a hand-held power tool, comprising:
 a shaft;
 a bearing element configured to support the shaft; and
 at least one first support unit and at least one second support unit configured to one or more of axially support and radially support the bearing element;
 wherein at least one of the at least one first support unit and the at least one second support unit is formed at least partially by a plate element having one or more of at least one axial bend and at least one radial bend, and
 wherein at least one of the at least one first support unit and the at least one second support unit includes (i) at least one first centering element configured to center at least a first of the at least one first support unit and the at least one second support unit on a gearbox housing of the hand-held power tool and (ii) at least one second centering element configured to center the bearing element of the shaft on at least the first of the at least one first support unit and the at least one second support unit.

12. The shaft bearing device as claimed in claim 11, wherein the at least one first centering element projects from a first side of the at least one of the at least one first support unit and the at least one second support unit and the at least one second centering element projects from a second, opposite side of the at least one of the at least one first support unit and the at least one second support unit.

13. The shaft bearing device as claimed in claim 11, wherein the at least one first centering element is a plurality of first centering elements spaced equidistantly around the at least one of the at least one first support unit and the at least one second support unit and the at least one second centering element is a plurality of second centering elements spaced equidistantly around the at least one of the at least one first support unit and the at least one second support unit.

14. The shaft bearing device as claimed in claim 13, wherein the plurality of first centering elements and the plurality of second centering elements are arranged alternatingly around the at least one of the at least one first support unit and the at least one second support unit.

15. The shaft bearing device as claimed in claim 14, wherein each first centering element of the plurality of first centering elements is offset from each second centering element of the plurality of second centering elements by 45 degrees.

16. The shaft bearing device as claimed in claim 14, wherein the plurality of second centering elements are connected together by connecting elements formed as webs.

17. The shaft bearing device as claimed in claim 16, wherein the webs have a web diameter which is smaller than a diameter formed by the plurality of first centering elements.

18. A hand-held power tool, comprising:
at least one shaft bearing device including:
 a shaft;
 a bearing element configured to support the shaft;
 at least one first support unit and at least one second support unit configured to one or more of axially support and radially support the bearing element; and
 at least one attachment unit configured to releasably connect the at least one first support unit and the at least one second support unit, the at least one attachment unit configured as a bayonet fixing,
 wherein at least one of the at least one first support unit and the at least one second support unit is formed at least partially by a plate element having one or more of at least one axial bend and at least one radial bend.

19. The hand-held power tool as claimed in claim 18, wherein the hand-held power tool is an angle grinder or a circular saw.

20. A system, comprising:
a shaft bearing device including:
 a shaft;
 a bearing element configured to support the shaft;
 at least one first support unit and at least one second support unit configured to one or more of axially support and radially support the bearing element, at least one of the at least one first support unit and the at least one second support unit formed at least partially by a plate element having one or more of at least one axial bend and at least one radial bend; and
 at least one third support unit differing from the at least one first support unit and the at least one second support unit
 wherein the at least one first support unit is configured to be connected alternatively to the at least one second support unit and the at least one third support unit.

* * * * *

UNITED STATES PATENT AND TRADEMARK OFFICE
CERTIFICATE OF CORRECTION

| | |
|---|---|
| PATENT NO. | : 8,905,644 B2 |
| APPLICATION NO. | : 13/814220 |
| DATED | : December 9, 2014 |
| INVENTOR(S) | : Florian Esenwein and Thomas Schomisch |

It is certified that error appears in the above-identified patent and that said Letters Patent is hereby corrected as shown below:

In the Claims

In claim 11, column 14, line 35, delete the (":") following the phrase "a shaft" and insert --;-- in its place.

Signed and Sealed this
Twenty-third Day of February, 2016

Michelle K. Lee
*Director of the United States Patent and Trademark Office*